(12) United States Patent
Revill et al.

(10) Patent No.: US 8,544,863 B2
(45) Date of Patent: Oct. 1, 2013

(54) HYDRAULIC SUSPENSION SYSTEM

(75) Inventors: Christopher Paul Revill, Dunsborough (AU); Raymond Andrew Munday, Busselton (AU)

(73) Assignee: Kinetic Pty Ltd., Dunsborough (AU)

( * ) Notice: Subject to any disclaimer, the term of this patent is extended or adjusted under 35 U.S.C. 154(b) by 1463 days.

(21) Appl. No.: 10/537,566

(22) PCT Filed: Dec. 8, 2003

(86) PCT No.: PCT/AU03/01637
§ 371 (c)(1),
(2), (4) Date: Nov. 9, 2005

(87) PCT Pub. No.: WO03/097908
PCT Pub. Date: Nov. 27, 2003

(65) Prior Publication Data
US 2006/0151969 A1    Jul. 13, 2006

(30) Foreign Application Priority Data
Dec. 6, 2002    (AU) ................................ 2002953153

(51) Int. Cl.
*B60G 11/56* (2006.01)
*B60G 15/06* (2006.01)

(52) U.S. Cl.
USPC ......... 280/124.16; 280/124.104; 280/124.106

(58) Field of Classification Search
USPC ....... 280/124.106, 124.157, 124.16, 124.161, 280/124.162; 267/64.26
See application file for complete search history.

(56) References Cited

U.S. PATENT DOCUMENTS

| | | | |
|---|---|---|---|
| 2,184,202 A * | 12/1939 | Tschanz | 280/5.506 |
| 3,752,497 A | 8/1973 | Enke et al. | |
| 5,040,823 A | 8/1991 | Lund | |
| 5,217,246 A | 6/1993 | Williams et al. | |
| 6,010,139 A * | 1/2000 | Heyring et al. | 280/124.104 |
| 6,217,047 B1 | 4/2001 | Heyring et al. | |
| 6,270,098 B1 | 8/2001 | Heyring et al. | |
| 6,338,014 B2 | 1/2002 | Heyring et al. | |
| 6,669,208 B1 | 12/2003 | Monk et al. | |
| 6,761,371 B1 * | 7/2004 | Heyring et al. | 280/124.157 |
| 7,168,720 B2 * | 1/2007 | Fontdecaba Buj | 280/124.159 |
| 7,210,688 B2 * | 5/2007 | Kobayashi | 280/5.505 |
| 7,240,906 B2 * | 7/2007 | Klees | 280/5.502 |
| 2002/0070522 A1* | 6/2002 | Sakai | 280/124.157 |

(Continued)

FOREIGN PATENT DOCUMENTS

| | | |
|---|---|---|
| AU | 70599/96 A | 5/1997 |
| DE | 37 08 806 A1 | 6/1988 |

(Continued)

*Primary Examiner* — Karen Beck
(74) *Attorney, Agent, or Firm* — Harness, Dickey & Pierce, P.L.C.

(57) ABSTRACT

A damping and stiffness system for a vehicle suspension system including at least two forward and two rearward wheel assemblies each associated with vehicle resilient support means (27-30) between a vehicle body and the wheel assemblies. The damping and stiffness system including: a wheel ram (11-14) with at least a compression chamber (45-48) between each wheel assembly and the vehicle body and a load distribution unit (76). The load distribution unit (76) includes two pairs of chambers (77-80), each chamber (77-80) being divided into front (89, 90) and back (91, 92) system chambers (which vary in volume proportionally and in opposite senses therein with piston motion) and the remaining pitch chambers (93-96) by interconnected pistons (81-84) supported therein. The compression chamber (45-48) of each wheel ram (11-14) is in fluid communication with a respective system chamber (89-92) wherein the vehicle is primarily supported by the vehicle resilient support means (27-30).

25 Claims, 5 Drawing Sheets

(56) References Cited

U.S. PATENT DOCUMENTS

2004/0169345 A1\* 9/2004 Fontdecaba Buj ....... 280/124.16
2006/0151969 A1\* 7/2006 Revill et al. ............ 280/124.106
2006/0237942 A1\* 10/2006 Munday et al. ........ 280/124.157

FOREIGN PATENT DOCUMENTS

| EP | 0 858 918 | 8/1998 |
| WO | WO 00/61394 | 10/2000 |
| WO | WO 01/21423 | 3/2001 |

\* cited by examiner

HYDRAULIC SUSPENSION SYSTEM

The present invention is directed to a suspension system for a vehicle, the suspension system providing at least roll stiffness and having independent control of heave, roll and pitch damping.

There are known many alternative interconnected suspension systems which have the ability to passively differentiate between different modes of wheel motion with respect to the vehicle body and therefore provide a variety of alternatives in functionality. For example, the applicants U.S. Pat. Nos. 6,010,139 and 6,270,098, details of which are incorporated herein by reference, provide several alternative layouts of a pressure balancing "load distribution" unit between two pairs of diagonally interconnected double acting wheel rams. This system provides different heave, roll and pitch stiffness rates with zero warp stiffness and different damping rates in all four base suspension modes (heave, roll, pitch and warp). This system supports the weight of the vehicle, so as the loads on the vehicle change, or as the fluid temperature changes, the volume of fluid in each of the six volumes in the system must be adjusted. Also, as the six volumes in the system can in some load conditions, all be at different pressures, there is the possibility for fluid to leak across seals, which also requires fluid volume adjustments to be made to maintain the correct vehicle attitude. This requires a high pressure fluid source, sensors, control electronics and valves, making the cost of the system relatively high for a passive system.

An example of a passive system providing high roll stiffness with low warp stiffness and negligible heave stiffness and providing high roll damping with lower, more comfortable and isolating heave damping can be found in the applicant's PCT/AU00/00312. As the system does not provide significant heave stiffness, separate support springs are required.

An example of a system having just roll and/or pitch damping can be found in Yamaha's U.S. Pat. No. 5,486,018 and Kayaba's U.S. Pat. No. 6,024,366. The system in these documents uses a device between a pair of wheel damping rams, each wheel damping ram having a damper valve in its piston to provide double-acting damping but make the ram single-acting (ie there is only fluid port). The device provides for independent levels of damping for in-phase (ie heave) and out of phase (ie roll and/or pitch) motions. However this system does not provide significant stiffness in any mode, so in addition to the need for support springs, generally anti-roll bars will be required for a good balance between bounce and roll stiffness. Additionally, as the wheel rams are effectively single acting (having only one fluid port) the amount of damping that the device can provide is limited. There are improvements made to the system to combat this problem, which can be found in Japanese patent office publication number 11291737, but these add more plumbing and spool valves.

It is therefore an object of the present invention to provide a hydraulic system for a vehicle suspension, the hydraulic system providing roll stiffness, roll damping, pitch damping and optionally pitch stiffness, all of which can be preferably designed and tuned independently from each other to enable optimisation of each parameter.

With this in mind, according to one aspect of the present invention there is provided a damping and stiffness system for a vehicle suspension system for a vehicle, the vehicle including a vehicle body and a first pair and a second pair of diagonally spaced wheel assemblies, the first pair of diagonally spaced wheel assemblies including at least one front left wheel assembly and at least one back right wheel assembly, the second pair of diagonally spaced wheel assemblies including at least one front right wheel assembly and at least one back left wheel assembly, the vehicle suspension system also including front and rear vehicle resilient support means between the vehicle body and the wheel assemblies for resiliently supporting the vehicle above the wheel assemblies, the damping and stiffness system including:

at least one wheel ram located between each wheel assembly and the vehicle body, each ram including at least a compression chamber;

a load distribution unit interconnected between the compression chambers of the front left, front right, back left and back right wheel rams, the load distribution unit including first and second piston rod assemblies, first, second, third and fourth system volumes and first and second modal resilience volumes, the first piston rod assembly including at least one rod and at least one piston, the diameter of the at least one rod and at least one piston defining first, second, third and fourth effective areas, the second piston rod assembly including at least one rod and at least one piston, the diameter of the at least one rod and at least one piston defining fifth, sixth, seventh and eighth effective areas, the first and second piston rod assemblies being located within the load distribution unit such that each piston rod assembly can rotate about and slide along a major axis of the piston rod assembly, the first effective area defines a movable wall of the first system volume such that as the first piston rod assembly slides along its major axis, the volume of the first system volume varies, the second effective area defines a moveable wall of the second system volume, the third effective area defines a movable wall of the first modal resilience volume, the fourth effective area defines a movable wall of the second modal resilience volume, the fifth effective area defines a movable wall of the third system volume such that as the second piston rod assembly slides along its major axis, the volume of the third system volume varies, the sixth effective area defines a moveable wall of the fourth system volume, the seventh effective area defines a movable wall of the first modal resilience volume, and the eighth effective area defines a movable wall of the second modal resilience volume, the first system volume increasing in volume proportionately to the decrease in volume of the second system volume with motion of the first piston rod assembly, the third system volume increasing in volume proportionately to the decrease in volume of the fourth system volume with motion of the second piston rod assembly, the volume of the first modal resilience volume decreasing proportionately to the increase in volume of the first and third system volumes with motion of the first and second piston rod assemblies, the volume of the second modal resilience volume decreasing proportionately to the increase in volume of the second and fourth system volumes, the first and fourth system volumes being connected to the compression chambers of the wheel rams associated with one of the pairs of diagonally spaced wheel assemblies, the second and third system volumes being connected to the compression chambers of the wheel rams associated with the other pair of diagonally spaced wheel assemblies, the damping and stiffness system thereby providing substantially zero warp stiffness; and wherein the vehicle is primarily supported by the vehicle resilient support means.

According to another aspect of the present invention, there is provided a damping and stiffness system for a vehicle suspension system for a vehicle, the vehicle including a vehicle body and at least two forward and two rearward wheel assemblies, the vehicle suspension system also including front and rear resilient vehicle support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, including a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a first front system chamber and being connected to the compression chamber of a front wheel ram on a first side of the vehicle, the other secondary chamber in the first pair of primary chambers which varies in volume in the same direction as the first front system chamber with motion of the first piston rod assembly, being a first back pitch chamber, one of the secondary chambers in the first pair of primary chambers which varies in volume in the opposite direction as the first front system chamber with motion of the first piston rod assembly being a first back system chamber and being connected to the compression chamber of a back wheel ram on a first side of the vehicle, the other secondary chamber in the first pair of primary chambers which varies in volume in the same direction as the first back system chamber with motion of the first piston rod assembly, being a first front pitch chamber one of the secondary chambers in the second pair of primary chambers being a second front system chamber and being connected to the compression chamber of a front wheel ram on a second side of the vehicle, the other secondary chamber in the second pair of primary chambers which varies in volume in the same direction as the second front system chamber with motion of the second piston rod assembly, being a second back pitch chamber, one of the secondary chambers in the second pair of primary chambers which varies in volume in the opposite direction as the second front system chamber with motion of the second piston rod assembly being a second back system chamber and being connected to the compression chamber of a back wheel ram on a second side of the vehicle, the other secondary chamber in the second pair of primary chambers which varies in volume in the same direction as the second back system chamber with motion of the second piston rod assembly, being a second front pitch chamber, the first and second front pitch chambers being interconnected forming a front pitch volume and the first and second back pitch chambers being interconnected forming a back pitch volume, wherein the vehicle is primarily supported by the resilient vehicle support means.

According to a further aspect of the present invention, there is provided a damping and stiffness system for a vehicle suspension system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, including a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a front left system chamber and being connected to the compression chamber of a front wheel ram on a left side of the vehicle, the other secondary chamber in the first pair of primary chambers which varies in volume in the same direction as the front system chamber with motion of the first piston rod assembly, being a first right roll chamber, one of the secondary chambers in the first pair of primary chambers which varies in volume in the opposite direction to the front left system chamber with motion of the first piston rod assembly being a front right system chamber and being connected to the compression chamber of the other front wheel ram on a right side of the vehicle, the other secondary chamber in the first pair of primary chambers which varies in volume in the same direction as the front right system chamber with motion of the first piston rod assembly, being a first left roll chamber, one of the secondary chambers in the second pair of primary chambers being a back left system chamber and being connected to the compression chamber of a back wheel ram on the left side of the vehicle, the other secondary chamber in the second pair of primary chambers which varies in volume in the same direction as the back left system chamber with motion of the second piston rod assembly, being a second right roll chamber, one of the secondary chambers in the second pair of primary chambers which varies in volume in the opposite direction as the second front system chamber with motion of the second piston rod assembly being a back right system chamber and being connected to the compression chamber of a back wheel ram on the right side of the vehicle, the other secondary chamber in the second pair of primary chambers which varies in volume in the same direction as the back right system chamber with motion of the second piston rod assembly, being a second left roll chamber, the first and second left roll chambers being interconnected forming a left roll volume and the first and second right roll chambers being interconnected forming a right roll volume, wherein the vehicle is primarily supported by the vehicle resilient support means.

The wheel rams may all be single-acting. Any single-acting rams should ideally use two chambers with damping in the piston of the ram to provide good control of rebound damping forces. It can be preferable, on vehicles with extreme roll moment distributions, to use double-acting rams on the end of the vehicle requiring the high roll stiffness and single-acing rams on the other end of the vehicle. Therefore the wheel rams at one end of the vehicle may include a rebound chamber, the rebound chamber of each wheel ram at one end of the vehicle being connected to the compression chamber of the diagonally opposite wheel ram (at the opposite end and on the opposite side of the vehicle).

However, on vehicles with more even roll moment distributions, the widest range of performance is achieved using double-acing wheel rams for all wheels. Therefore each wheel ram includes a rebound chamber, the rebound chamber of each double-acting wheel ram being connected to the compression chamber of the diagonally opposite wheel ram.

To enable the vehicle to move in the heave direction, resilience is required in the stiffness and damping system. This resilience may come partially or even wholly from the fluid used. However it is preferable for additional resilience to be added, since damping of this additional resilience enables some degree of modal damping. Therefore the compression chamber of each wheel ram may be in fluid communication with a respective accumulator.

The front pitch volume may be connected to the back pitch volume through a pitch valve arrangement. When fluid flows through the pitch valve there is no pitch stiffness provided by the stiffness and damping system, only some pitch damping, partially controlled by any damper valve in the pitch valve arrangement. For maximum comfort it may be advantageous to have no damping in the pitch valve arrangement in some conditions.

The front pitch volume may be connected to a front pitch accumulator through a front pitch damper valve and the back pitch volume may be connected to a back pitch accumulator through a back pitch damper valve. If no pitch valve is used, or if it is closed, the front and back pitch accumulators provide additional pitch resilience in the stiffness and damping system.

The pitch valve arrangement may include a controlled variable damper valve. Alternatively the pitch valve arrangement may include a passive damper valve. Alternatively or additionally, the pitch valve arrangement may include a lockout valve to isolate the front pitch volume from the back pitch volume. The pitch valve arrangement may include valves which are actuated in response to any or all of longitudinal acceleration, throttle position sensor or switch, brake position sensor or switch, vehicle speed, pitch velocity and/or acceleration signals, front and rear vertical accelerometers, or wheel position sensors.

A roll valve may be provided to interconnect the two front compression chambers and or a roll valve may be provided to interconnect the two back compression chambers. These roll valves remove some or all of the roll stiffness and damping of the stiffness and damping system, thereby improving comfort when the vehicle is travelling in a straight line. The valve(s) can therefore be controlled to be open during straight line running and closed during cornering or when the surface requires more roll stability from the suspension system. The valve(s) may be actuated in dependence on any or all of steering angle, steering rate, vehicle speed, lateral acceleration, roll velocity or acceleration signals, left and right vertical accelerometers, or wheel positions.

As the support means are the primary support for the vehicle body, all four system chambers (front left, front right, back left and back right) can have the same static operating/precharge pressure. Also, as the system contains hydraulic fluid and gas, both of which expand with increasing temperature, a pressure compensation arrangement is required in order to maintain the system static pressure and roll stiffness within a design range over the design temperature. This pressure compensation arrangement can also be used to compensate for any fluid loss over time. Therefore a pressure maintenance device can be connected to each of the four system chambers by respective valves. Additionally, the pitch chambers can have the same operating/precharge pressure as each other and even optionally, the same pressure as the system chambers. Therefore, at least one pitch chamber may be connected to the pressure maintenance device through a valve. The valves between the pressure maintenance device and the pitch chamber(s) can be simple restrictions, preferably including filters on both sides of each restriction. Alternatively they may be any other type of valve such as a solenoid actuated valve, although to prevent sudden motions of the vehicle on opening of such valves, a restriction would ideally be included.

The pressure maintenance device can be a simple accumulator. Alternatively it can include a fluid pressure source and regulate to a preset pressure. The fluid pressure source may be a pump and a tank and accumulator may be included. Alternatively, the fluid pressure source may be a conduit from another fluid pressure source on the vehicle, such as power steering, brakes, etc.

The preset pressure that the pressure maintenance device regulates to may be a fixed pressure (ie using a pressure relief valve to cold circuit fluid or a pressure switch). Alternatively the preset pressure that the pressure maintenance device regulates to may be may be varied as a result of operator input (to switch or control stiffness), as a function of vehicle load, as a function of system temperature, or a combination of any or all of the above.

The pressure maintenance device may include first and second output pressure conduits, the system chambers being connected to the first output pressure conduit and the at least one pitch chamber being connected to the second output pressure conduit. The pressure in the system chambers can then be regulated separately from the pitch chamber pressure. The pressure in either or both of the first and second output pressure conduits may be determined by individual simple accumulators or regulated to a fixed or variable pressure. In that way the roll and pitch stiffnesses of the stiffness and damping system can be separately regulated.

In order to provide a centring force on the load distribution unit piston and rod assemblies, resilient centring devices may be used in either the system or pitch chambers.

The vehicle support means may be any known support means such as coil springs, air springs, torsion bars, leaf springs and rubber cones. The vehicle support means can, in the case of coil springs and air springs, be mounted around the wheel rams or mounted separately.

The accompanying drawings illustrate preferred embodiments of the present invention. Other embodiments are possible, and consequently the particularity of the accompanying, drawings is not to be understood as superseding the generality of the preceding description of the invention. In the drawings.

Figure 1:
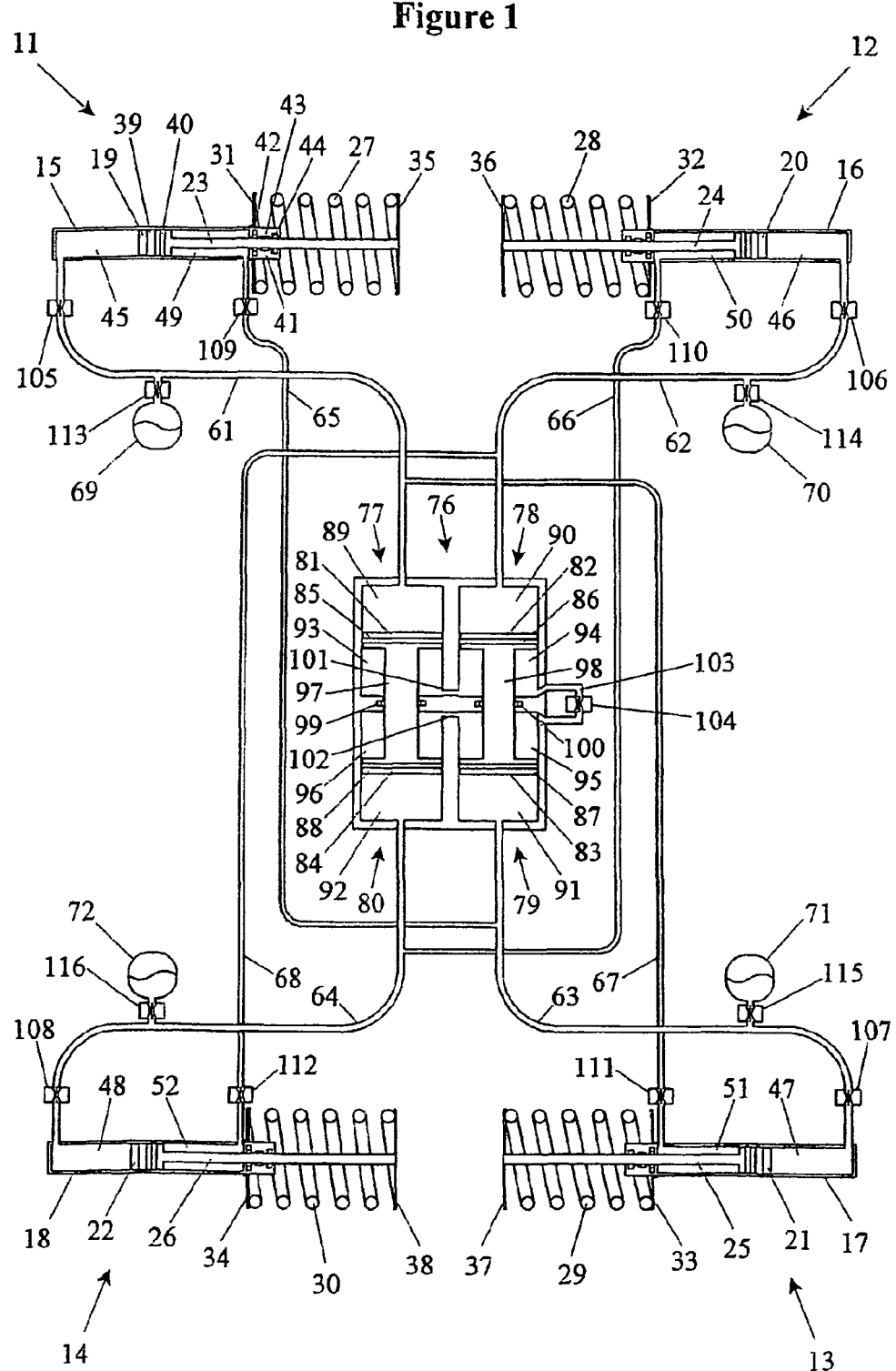
FIG. 1 is a schematic view of a first preferred embodiment of a hydraulic system having roll stiffness and roll and pitch damping, according to the present invention.

Referring initially to FIG. 1, there is shown a suspension system for a vehicle. Four wheel rams (11, 12, 13, 14) are located between the vehicle body (not shown) and four orthogonally disposed wheels (not shown) of the vehicle.

Each wheel ram includes a cylinder (15, 16, 17, 18) connected to a wheel hub or other suspension geometry to move with the wheel, a piston (19, 20, 21, 22) slidably housed within the cylinder, and a rod (23, 24, 25, 26) fixed between the piston and the body of the vehicle. The connection of the rod to the vehicle body may be by any known means, usually through a rubber bushing which in the case of MacPherson strut geometry usually includes a bearing.

For ease of understanding, the vehicle resilient support means are shown as "coil-overs", ie coil springs (27, 28, 29, 30) positioned around the wheel ram and located between a lower spring plate (31, 32, 33, 34) fixed to the cylinder and an upper spring plate (35, 36, 37, 38) which may be connected to the vehicle body or the rod (directly or indirectly such as via a bearing or bushing). It should be understood that the resilient support means may be of any alternative known type such as for example air springs and may be located around the cylinder as shown with the coil springs or separate to the ram, which broadens the alternatives, for example, to torsion bars connected to the geometry providing wheel location.

The wheel rams are basically conventional double-acting rams. Taking the front left wheel ram 11 as an example, the piston 19 (which may be formed as an integral part of the rod 23) has two grooves containing a bearing 39 and a seal 40. In some cases, the individual bearing and seal parts can be replaced by a single item (not shown) which may be bonded to or formed around the piston for ease of assembly and low cost. The cylinder end (41) has three grooves containing a rod seal 42, a bearing 43 and a rod wiper 44 or other form of secondary seal such as an excluder. Each ram therefore has a compression chamber (45, 46, 47, 48) and a rebound chamber (49, 50, 51, 52) formed by the piston (19, 20, 21, 22) within each cylinder (15, 16, 17, 18).

The four double-acting wheel rams comprise two diagonal pair of wheel rams. Each diagonal pair of wheel rams is connected by a diagonal circuit forming a pair of diagonal circuits to provide passive decoupling of roll and pitch stiffness from heave stiffness. The first diagonal circuit comprises two fluid volumes, a front left compression volume and a back right compression volume.

The front left compression volume includes the front left compression chamber 45, a front left compression conduit 61, a front left compression accumulator 69, a back right rebound conduit 67 and a back right rebound chamber 51. The back right compression volume similarly includes a back right compression chamber 47, a back right compression conduit 63, a back right compression accumulator 71, a front left rebound conduit 65 and a front left rebound chamber 49.

The second diagonal circuit similarly comprises two fluid volumes, a front right compression volume and a back left compression volume. The front right compression volume includes the front right compression chamber 46, a front right compression conduit 62, a front right compression accumulator 70, a back left rebound conduit 68 and a back left rebound chamber 52. The back left compression volume similarly includes a back left compression chamber 44, a back left compression conduit 64, a back left compression accumulator 72, a front right rebound conduit 66 and a front right rebound chamber 50.

This simple diagonal connection arrangement would displace a compression chamber and the annular rebound chamber of the diagonally opposite wheel ram into each accumulator in roll and pitch, whereas in heave only a rod volume (compression chamber minus annular rebound chamber) is displaced into the accumulator giving a higher roll and pitch stiffness than heave stiffness.

Between the first and second diagonal circuits is a load distribution unit 76 comprising four primary chambers (77, 78, 79, 80), each separated by a piston (81, 82, 83, 84) including a piston seal (85, 86, 87, 88) into a system chamber (89, 90, 91, 92) and a pitch chamber (93, 94, 95, 96). The pistons are connected together in pairs by rods (97, 98) which have seals (99, 100) running on them to seal pitch chamber 93 from 96 and 94 from 95, each piston pair with an associated rod forming a piston rod assembly. The effective area of the piston rod assembly acting on each system chamber is the area determined by the bore diameter of the primary chamber. The effective area of the piston rod assembly acting on each pitch chamber is the annular area determined by the difference between area determined by the bore diameter of the primary chamber and the area determined by the rod diameter of the piston rod assembly.

The front left system chamber 89 is connected to the front right compression conduit 61 and now forms part of the previously defined front left compression volume. Similarly, the front right system chamber 90 is connected to the front right compression conduit 62 and now forms part of the front right compression volume, the back right system chamber 91 is connected to the back right compression conduit 63 and now forms part of the back right compression volume, and finally, the back left system chamber 92 is connected to the back left compression conduit 64 and now forms part of the back left compression volume.

In roll, the rods (97, 98) react the pressure changes in the first and second diagonal circuits, maintaining the roll stiffness of the hydraulic system. To remove the warp stiffness of the hydraulic system, the front left pitch chamber 93 is connected to the front right pitch chamber 94 by a passage 101 (the two front pitch chambers 93, 94 and the passage 101 together forming a front pitch volume or a front bump resilience volume), and the back right pitch chamber 95 is connected to the back left pitch chamber 96 by a similar passage 102 (the two back pitch chambers 95, 96 and the passage 102 together forming a back pitch volume or a back bump resilience volume).

To remove the pitch stiffness of the hydraulic system, the front pitch chambers 93, 94 are connected to the back pitch chambers by a passage (103). In order to provide pitch damping in the hydraulic system, a damper valve 104 is placed in the passage 103. The damper valve 104 can be a passive valve of any known type (shim tree stack, coil blow-off, etc) or may actually be, or simply incorporate a controlled variable restriction (the control being based on inputs from sensors for longitudinal acceleration and/or throttle and brake position). The maximum force available at the wheels, due to this pitch damping valve 104 is limited by the pitch stiffness of the first and second diagonal circuits (which is related to the roll stiffness and therefore far higher than is ever desirable). This arrangement allows the pitch damping of the suspension to be set relatively independently of all other parameters, giving great freedom to achieve the optimum damping setting for a vehicle.

One preferred arrangement of the pitch damper valve 104 is a passive damper valve in parallel with a high flow switchable bypass valve which is controlled to be open in normal steady state running of the vehicle and closed while the vehicle is accelerating or braking. A more complex control can be used if pitch acceleration or wheel positions are sensed to allow the valve to also be closed over wave inputs which are of the frequency that excites pitch of the vehicle body. When the bypass valve is in the open position, single wheel damping is reduced (as it is related to pitch damping), providing further comfort gains and permitting the use of a more aggressive pitch damper valve if necessary to control pitch when the bypass valve is closed.

Damping of all motions of each wheel relative to the body can be achieved using dampers at the cylinders to damp the passage of fluid primarily out of (but can also be into) at least one of the chambers of each wheel ram. Restrictions (105, 106, 107, 108) are shown on the front compression conduits for providing damping. These restrictions may act for fluid flow in both directions to provide compression and rebound damping. However, with typical system design parameters, it is preferable that the restrictions 105, 106, 107, 108 are compression dampers only, acting to restrict fluid flow in only the compression direction with an intake (non-return) valve used in parallel to allow free flow of fluid into the compression chambers in rebound motions to prevent cavitation. Then rebound dampers (109, 110, 111, 112) are required which are similarly single acting, this time for rebound direction fluid flows, with an intake valve in parallel for free ingress of fluid into the rebound chamber in compression motions. Of course, the rebound valves (109, 110, 111, 112) can be designed to provide similar or differential restrictions in both directions if required.

These wheel damper valves (105 to 112) can be integrated into the ram design or fitted as shown, on the conduits. They can be of any known form, and can be controlled to provide variable or switchable force vs. velocity curves.

Additional damper valves can be used between the system conduits and the accumulators to provide additional damping, primarily for roll and pitch motions of the vehicle. Again, although these valves are shown as simple restrictions, they may take the form of any known damper valve, including variable damper valves and may be switchable between comfort and handling settings (or a switchable bypass may be used to reduce or eliminate their effect).

If the compression damper valves (105 to 109) are integrated into the wheel rams (11 to 14) then the accumulators (69 to 72) and the optional accumulator damper valves (113 to 116) can also be integrated into the wheel rams.

As the hydraulic system is not the primary means of support (ie the coil springs—or air, etc. springs provide a large portion of the vehicle support) all of the volumes in the system (the previously defined front and rear left and right compression volumes, and the front and back pitch volumes) can be operated at a common static pre-charge pressure. The advantage of operating all systems at the same static pre-charge pressure is that pressure differentials across piston seals throughout the system are eliminated and so therefore are attitude changes caused by fluid leakage between the systems, and the need for a powered control system which can pump fluid between the volumes.

Figure 2:
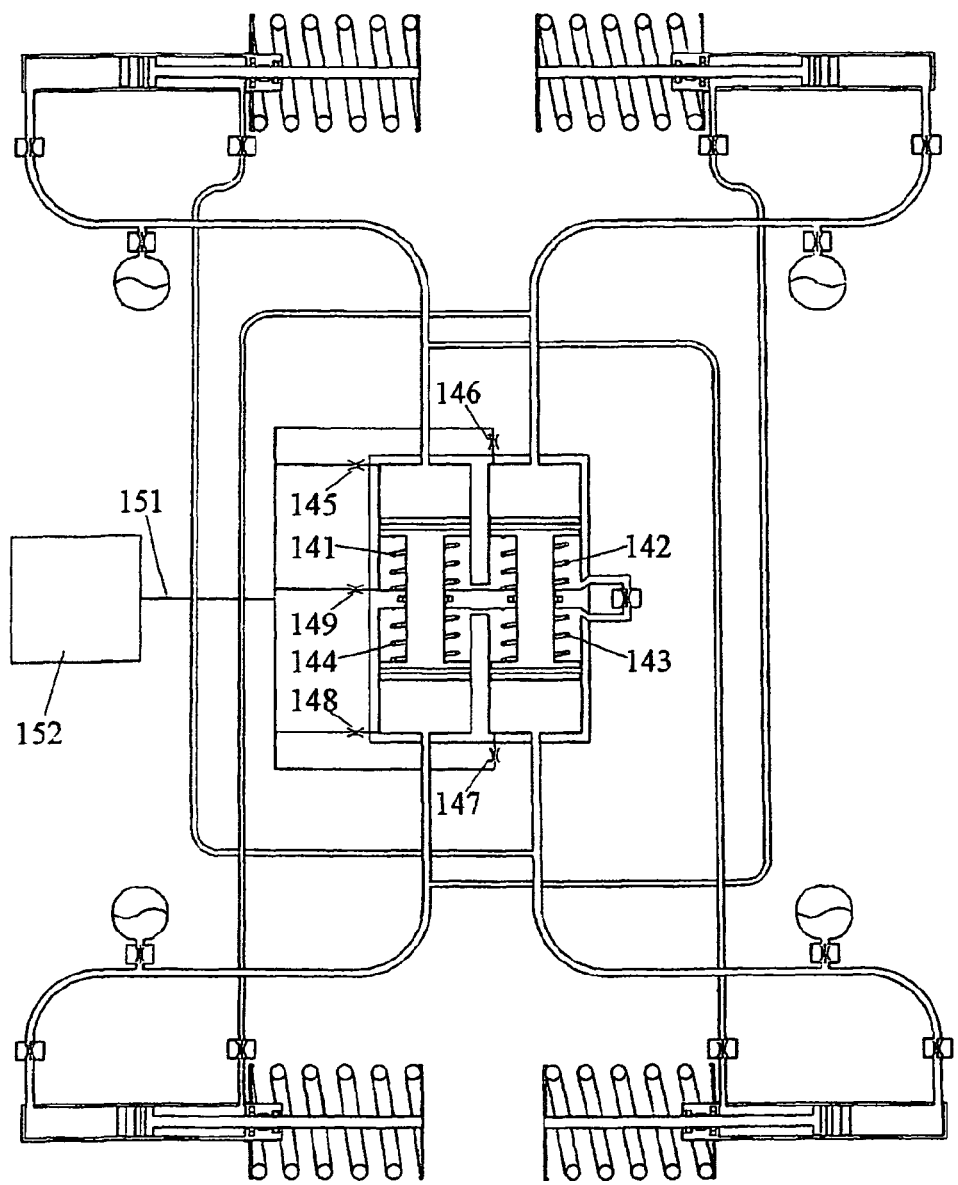
FIG. 2 is a schematic view of a second preferred embodiment arrangement of a hydraulic system according to the present invention, being similar to the first arrangement, but with the addition of a pressure maintenance arrangement.

Although a powered control system using pump, valves, position sensors can be used if desired, FIG. 2 shows a preferred method of maintaining the average position of the load distribution unit pistons and the static pre-charge pressure in the fluid volumes.

If the system volumes are all run at a common pressure and interconnected (albeit in a highly restricted manner), it is possible to maintain the centre position of the pistons in the load distribution unit using resilient devices to bias the pistons to a central position without the need for any sensors or powered adjustment. The resilient devices add to the pitch, warp and single-wheel stiffnesses of the hydraulic system, so this should be borne in mind when selecting the stiffness of these springs. Coil springs are shown in FIG. 2 although any resilient device may be used.

The system chambers are connected via restrictions (145, 146, 147, 148) to a common conduit or passage 151 which is in turn connected to a pressure maintenance device 152. The interconnected front and back pitch volumes only require a single heavily damped connection to the pressure maintenance device 152, shown as the restriction 149, also connected to the common conduit or passage 151. Each restriction is typically a micro orifice with filters either side to prevent blockage, although any known restrictive means may be used. The orifice is sized to provide the characteristics required to maintain the pressures in the system volumes within an acceptable range whilst preventing significant fluid loss during cornering to maintain the static roll attitude within an acceptable range when returning to straight line running.

Although the pressure maintenance device 152 may be omitted, changes in the volumes of fluid and gas in the hydraulic system and its accumulators through the operating temperature range of the vehicle are usually large enough to require some form of compensation device. The complexity of this device can vary significantly, depending on the design parameters and the functionality required.

In its simplest form, the pressure maintenance device (152) can be a simple accumulator with any known construction (for example bladder-type with gas spring, piston-type with gas spring or with mechanical spring).

Alternatively the pressure maintenance device (152) can use a fluid pressure source (such as a tank with a pump, or another vehicle system such as the power steering) to maintain the pressure in the hydraulic suspension volumes to either a fixed or a variable pressure. If a fixed pressure is chosen, the components required can be simple, cheap, passive, mechanical parts, however as the system temperature changes, the system stiffness will change slightly. To maintain the system stiffness characteristics constant with varying temperature, the pressure in the systems must be adjusted in dependence on their temperature.

Also, the roll stiffness of the hydraulic suspension system can be adjusted by changing the pressure in the systems, so if a pressure maintenance device (152) with variable pressure set-points is used, the pressure can be varied in dependence on the load in the vehicle and/or by a driver operated mode selector or a variable selector.

Figure 3:
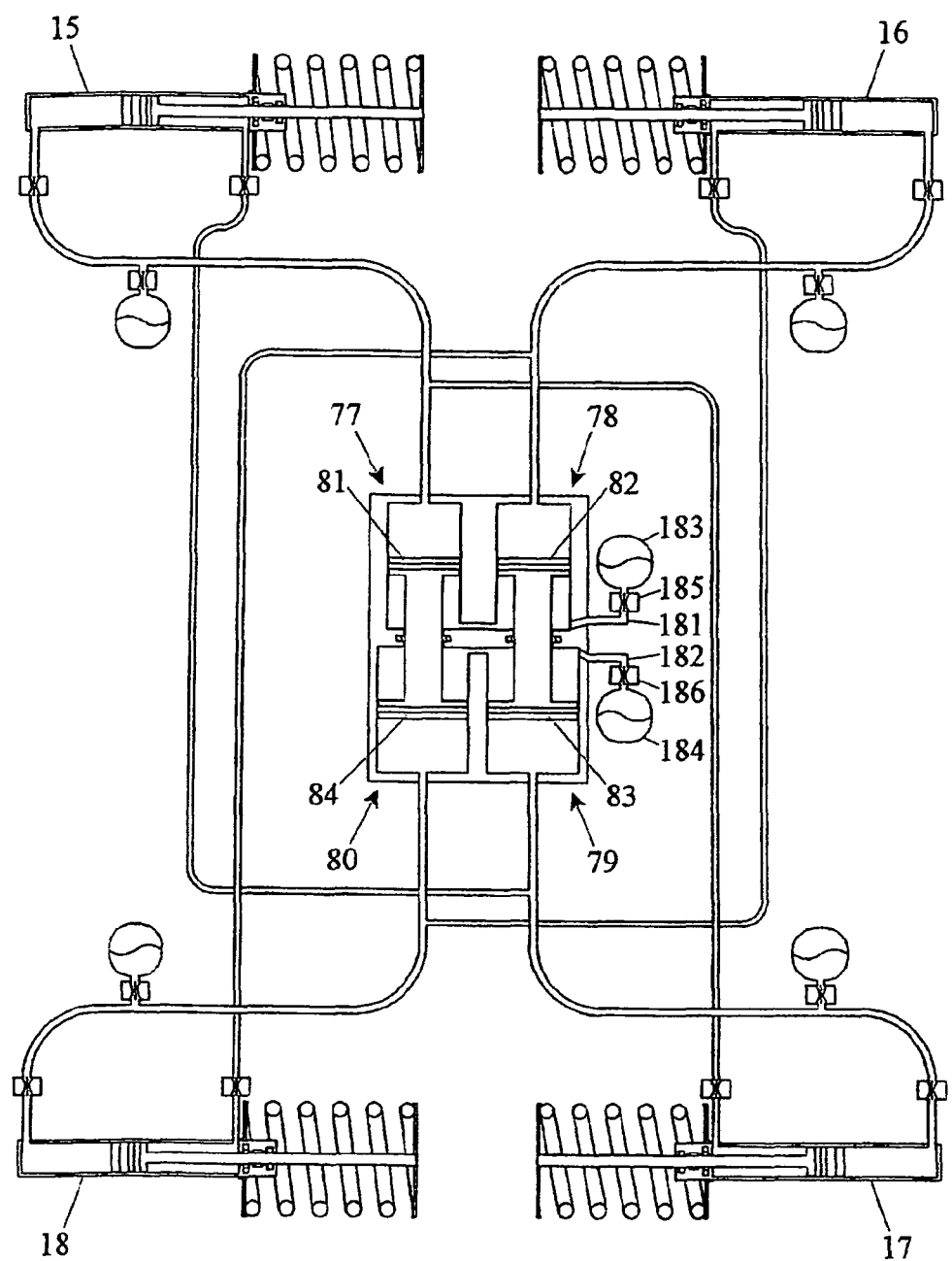
FIG. 3 is a schematic view of a third preferred embodiment of a hydraulic system according to the present invention, having both stiffness and damping in both the roll and pitch modes.

FIG. 3 shows an alternative arrangement of the hydraulic suspension system. The passage 103 connecting the pitch volumes has been removed and each pitch volume is now connected via a passage or conduit (181, 182) to a respective accumulator (183, 184). This arrangement provides a pitch stiffness, determined by the cylinder sizes and the gas volume in each accumulator. Therefore, the pitch stiffness can be set very low. One advantage of this arrangement over the version in FIGS. 1 and 2 is that the diameter of the primary chambers (77, 78, 79, 80) in the load distribution unit can be used to set the roll moment distribution (or contribute to it). In FIGS. 1 and 2, the diameter of the cylinders (15, 16, 17, 18) of the wheel rams is the main tuning parameter available (along with the mechanical advantage of the wheel rams, etc) to enable the roll moment distribution of the system to be set. The pistons (81, 82, 83, 84) in the load distribution unit are all of the same diameter, as the fluid used in the pitch chambers is reasonably incompressible, so the front to rear volumes must match (although see additional notes below). If the pistons in the load distribution unit are all of the same diameter, then to proportion the force changes in a typical greater than 50% distribution between the front and rear wheel rams in roll, the diameter of the front cylinders (15, 16) must be larger than the diameter of the rear cylinders (17, 18). Then when the pressure is balanced through the load distribution unit rods and pistons, the larger front cylinder diameter gives a larger front cylinder force. However, when the vehicle roll moment distribution is extreme (can be over 80%), the diameter of the front cylinders (15, 16) becomes extreme compared to the diameter of the back cylinders (17, 18). This causes large volumes of fluid to be moved to and from the front wheel rams with front wheel motion, leading to undesirable ram forces due to fluid mass acceleration effects. This can be overcome by sizing the front and rear cylinders (15, 16 and 17, 18) to have a more similar diameter and changing the roll moment distribution of the hydraulic system using the load distribution unit. In FIG. 3, the front primary chambers (77, 78) have a smaller diameter than the rear primary chambers (79, 80). This means that in roll, for the load distribution unit rods and pistons to be balanced, the pressure in the front compression volumes must be higher than the pressure in the back compression volumes, giving the required direction in roll moment distribution. The load distribution unit can be sized to provide the entire bias required for the design roll moment distribution for the hydraulic system, or a portion of the bias, with the wheel cylinder diameters being used to make up the rest of the bias required, or the wheel cylinders can be used to provide the entire bias required, with the load distribution unit having similar diameter chambers all round.

It should be noted that an accumulator could be used on the passage 103 in FIGS. 1 and 2, with two single acting damper valves, one between the accumulator and the front pitch volume, damping fluid flowing out of the front pitch volume, and one between the accumulator and the back pitch volume damping fluid flowing out of the back pitch volume. Then differential bores can be used between the front primary chambers (77, 78) and the back primary chambers (79, 80) to adjust roll moment distribution as described above.

Returning to the arrangement shown in FIG. 3, pitch damping is provided by damper valves (185, 186) in the conduits (181, 182) between the two pitch volumes and their respective accumulators (183, 184). Again, preferably these damper valves are single-acting, providing restriction in the compression direction for each accumulator (ie they act to restrict fluid flow out of the pitch volumes into the accumulators and have relatively free flowing 'intake valves' to allow fluid to freely flow out of the accumulators back into the pitch volumes. These valves can be of any known construction and can be switchable or provide variable damping curves.

The pressure maintenance arrangement shown in FIG. 2 can be easily and obviously adapted to include a restricted connection to the back pitch volume as it is not longer in communication with the front pitch volume. Alternatively, the pitch volumes can be maintained at a different pressure to the front and back, left and right system volumes. Then the roll stiffness could be controlled by controlling pressure in the four system volumes and the pitch stiffness could be controlled separately by controlling the pressure in the two pitch volumes.

An alternative method of changing the roll and/or pitch stiffness is to use additional accumulators. For roll, accumulators can be located on the two front, the two rear, or all four compression volumes. For pitch, additional accumulators can be added to either or both of the front and back pitch volumes. In all cases, the accumulators can be connected to the hydraulic system through switchable lockout valves. This allows for the roll and/or pitch stiffness to be switched between a high and a low setting. These settings are generally either side of a multi purpose single setting, so that the system can provide improved handling and control with high stiffness and improved comfort with low stiffness, as selected or controlled automatically by any know means (acceleration sensors, throttle and brake sensors, position sensors, etc). An alternative to hydraulically switching a whole accumulator in and out of the systems, is to use an accumulator design with two gas volumes, then simpler, cheaper gas switching valves can be used to vary the gas volumes available to the systems by switching the lock-out valve to between the two gas volumes to isclate one of the volumes.

Figure 4:
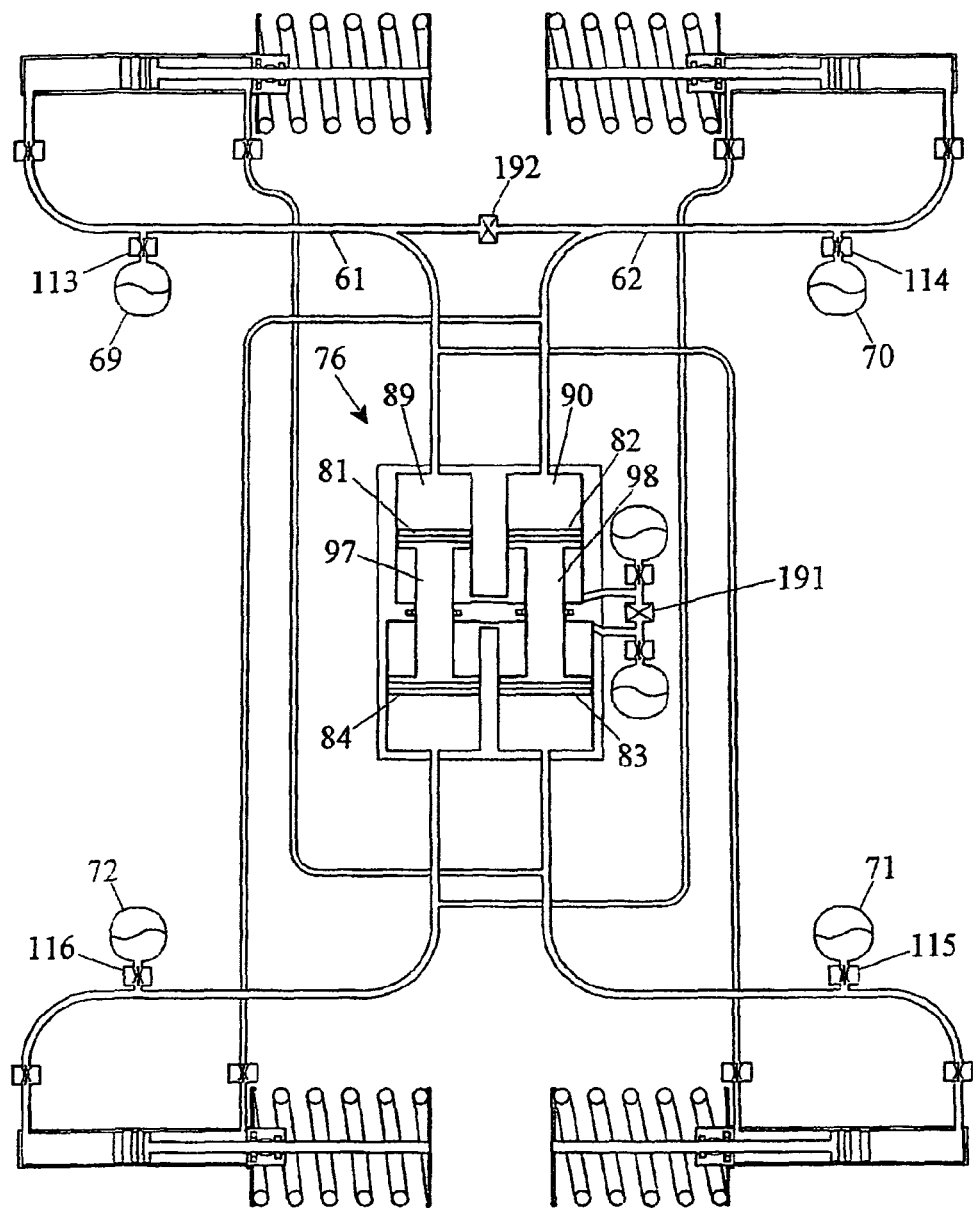
FIG. 4 is a schematic view of a fourth preferred embodiment of a hydraulic system according to the present invention, including valves to reduce or eliminate roll and pitch stiffness and damping.

A further alternative method to switch the roll and/or pitch stiffness is to employ 'bridging valves' which connect at least two of the system or pitch volumes together, as shown in FIG. 4.

Pitch interconnection valve 191 interconnects the front and back pitch volumes together to remove the pitch stiffness as in FIGS. 1 and 2. This pitch interconnect valve 191 may be a simple lockout valve to remove the pitch stiffness and damping to give the optimum comfort levels, or it may include a damper valve in series with the lockout valve to damp the interconnection. Alternatively, it may be a controlled variable damper valve or even just a passive damper valve. The control of the lockout valve or variable damper valve needs to sense vehicle parameters to ensure that the hydraulic system is stiff in pitch during accelerating, braking or wave-induced pitch motions, and that the system is soft in pitch (and therefore provides improved single-wheel comfort) during normal running of the vehicle. It could be a mechanical or electrical arrangement, sensitive to longitudinal acceleration, brake or throttle position. Alternatively, it could be electronic, sensing pitch motions using accelerometers and/or wheel positions, instead of, or in addition to, or alternatively sensing longitudinal acceleration, brake or throttle position.

Roll interconnection valve 192 is shown interconnecting the two front compression conduits (61, 62) of the hydraulic system. This removes a large component of the roll stiffness and roll damping of the hydraulic system as, not only can the front compression volumes freely exchange fluid, removing the roll stiffness and damping (normally due to the accumulators 69, 70 and their damper valves 113, 114) but the back compression volumes can exchange fluid through the load distribution unit piston and rod assemblies (81, 97, 84 and 82, 98, 83) moving (as if reacting to a warp motion) and transferring fluid through the front compression conduits and the roll interconnection valve 192. To reduce the flow path required for the fluid from the back compression volumes, a similar roll interconnection valve may be provided between the back compression conduits. Either way the roll stiffness and damping due to the rear compression accumulators 71, 72 and their damper valves 115, 116 is also partially or substantially removed.

The roll interconnection valve(s) can be located anywhere between the front (and/or rear) compression volumes. For example, the valve 192 can be designed into the load distribution unit (76), interconnecting the front compression system chambers 89, 90.

As with the pitch interconnection valve, the roll interconnection valve(s) can be a lockout valve or variable restriction. The control can be mechanical or electrical, sensitive to lateral acceleration or steering wheel position. Ideally the control is electronic, sensing steering angle and/or steering velocity, vehicle speed and lateral acceleration.

Although FIG. 4 shows differential bores in the load distribution unit, obviously the same diameter bore can be used front and rear if desired.

Single-acting rams can be used at all four wheels, but the roll stiffness and damping available is very limited. However, in the case of extreme roll moment distributions (70% upwards or an even broader range, depending upon vehicle stiffness and geometry parameters) it can be beneficial to use single-acting rams at one end of the vehicle. Double-acting rams are retained at the end of the vehicle requiring higher change in roll loads. With the single-acting rams, the rebound conduits are deleted. Ideally the pistons are used as damper valves to provide sufficient rebound damping for control.

The connection sequence of the hydraulic rams to the load distribution unit is the same in all of FIGS. 1 to 4. However, as is obvious to any person skilled in the art, the connection sequence can be changed to produce similar functionality. The connecting passages 101 and 102 may need to be moved to suit. For example, the system chambers can all be in the two forward primary chambers (77, 78), either side of the two pistons 81 and 82, with the pitch chambers being in the other two primary chambers (79, 80) either side of pistons 83 and 84. Alternatively, the system and pitch chamber locations could be reversed from the layout shown in FIGS. 1 to 4.

Figure 5:
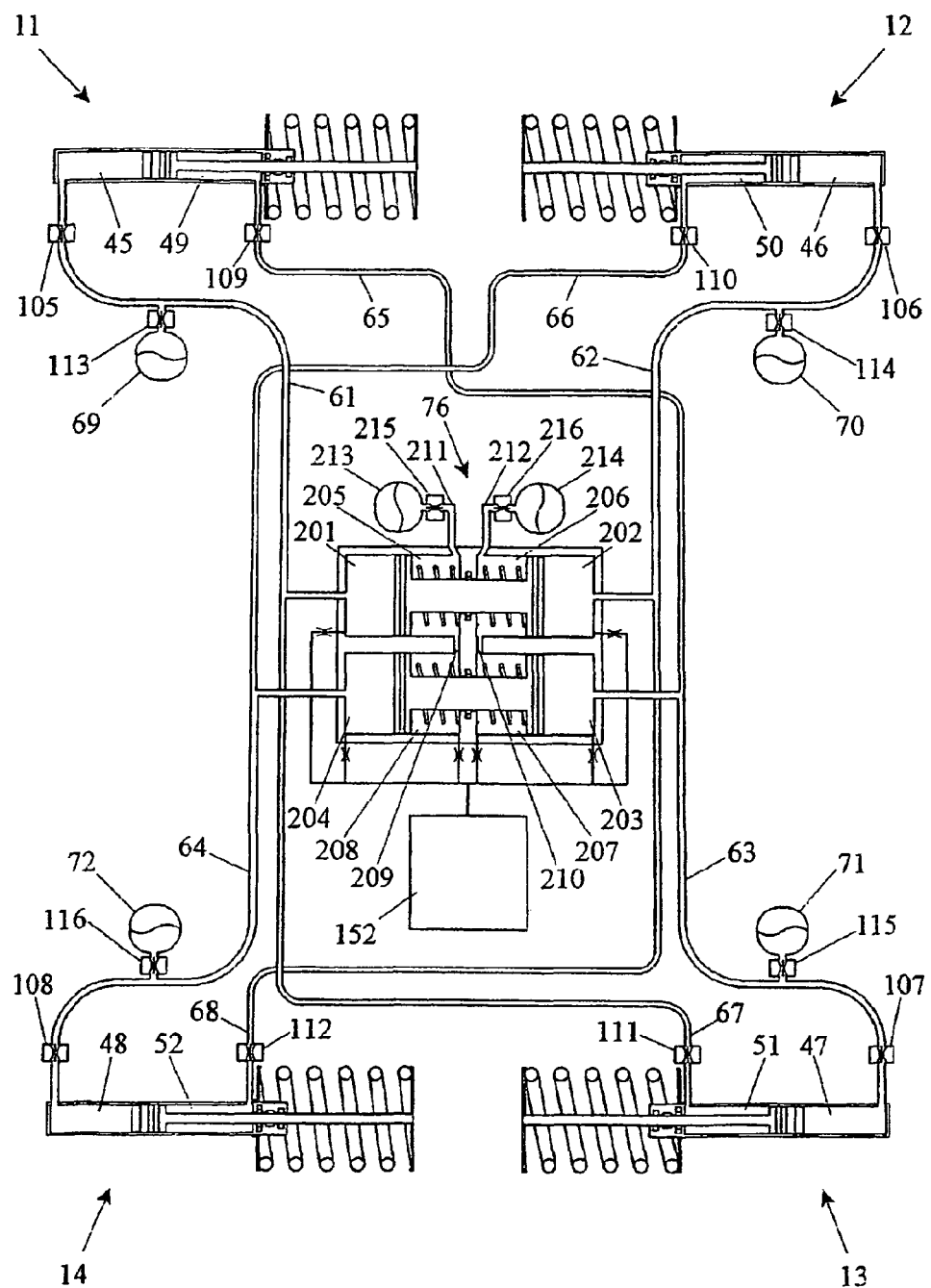
FIG. 5 is a schematic view of a fifth preferred embodiment of a hydraulic system according to the present invention.

FIG. 5 shows an alternate connection sequence of the hydraulic rams to the load distribution unit. In FIGS. 3 and 4, if the pitch accumulators (183, 184) were infinitely stiff, the pitch stiffness of the hydraulic system would be determined by the roll stiffness. However for normal road vehicle suspension set up, the pitch stiffness is usually less than the roll stiffness, so the compliance provided by the pitch accumulators (183, 184) permits a pitch stiffness of below or up to the roll stiffness. However, on some vehicles such as race cars with aerodynamic aids, control of pitch attitude can be very important. In this case, the hydraulic system can be effectively rotated through ninety degrees as shown in FIG. 5. This arrangement permits the hydraulic system to provide a high pitch stiffness with a lower heave stiffness, zero warp stiffness and a roll stiffness between the heave and warp stiffness.

The construction of the LDU is similar to in the previous figures. Although all system chambers 201-204 are shown of equal diameter, it is possible to change the roll moment distribution of the hydraulic system by using different diameter system chambers front (201, 202) to rear (203, 204). The front left system chamber 201 is connected to the front left compression conduit 61, the front right compression chamber is connected to the front right compression conduit, the back right system chamber is connected to the back right compression conduit and the back left system chamber is connected to the back right compression conduit. This rotating of the LDU through ninety degrees has effectively turned the pitch chambers of previous arrangements into roll chambers 205-208. The two left roll chambers (205, 208) are interconnected by a passage 209 and the two right roll chambers (206, 207) are interconnected by a passage 210. The two left roll chambers are also connected by a passage 211 to a left roll accumulator 213, via a left roll damper valve 215. Similarly, the two right roll chambers are connected by a passage 212 to a right roll accumulator 214, via a right roll damper valve 216.

The invention claimed is:

1. A vehicle suspension system having a damping and stiffness system for a vehicle, the vehicle including a vehicle body and a first pair and a second pair of diagonally spaced wheel assemblies, the first pair of diagonally spaced wheel assemblies including at least one front left wheel assembly and at least one back right wheel assembly, the second pair of diagonally spaced wheel assemblies including at least one front right wheel assembly and at least one back left wheel assembly, the vehicle suspension system also including front and rear vehicle resilient support means between the vehicle body and the wheel assemblies for resiliently supporting the vehicle above the wheel assemblies, the damping and stiffness system including:

at least one wheel ram located between each wheel assembly and the vehicle body, each ram including at least a compression chamber;

a load distribution unit interconnected between the compression chambers of the front left, front right, back left and back right wheel rams, the load distribution unit including first and second piston rod assemblies, first, second, third and fourth system volumes and first and second modal resilience volumes, the first piston rod assembly defining first, second, third and fourth effective areas, the second piston rod assembly defining fifth, sixth, seventh and eighth effective areas, the first and second piston rod assemblies being located within the load distribution unit such that each piston rod assembly can rotate about and slide along a major axis of the piston rod assembly, the first effective area defines a movable wall of the first system volume such that as the first piston rod assembly slides along its major axis, the volume of the first system volume varies, the second effective area defines a moveable wall of the second system volume, the third effective area defines a movable wall of the first modal resilience volume, the fourth effective area defines a movable wall of the second modal resilience volume, the fifth effective area defines a movable wall of the third system volume such that as the second piston rod assembly slides along its major axis, the volume of the third system volume varies, the sixth effective area defines a moveable wall of the fourth system volume, the seventh effective area defines a movable wall of the first modal resilience volume, and the eighth effective area defines a movable wall of the second modal resilience volume, the first system volume increasing in volume proportionately to the decrease in volume of the second system volume with motion of the first piston rod assembly, the third system volume increasing in volume proportionately to the decrease in volume of the fourth system volume with motion of the second piston rod assembly, the volume of the first modal resilience volume decreasing proportionately to the increase in volume of the first and third system volumes with motion of the first and second piston rod assemblies, the volume of the second modal resilience volume decreasing proportionately to the increase in volume of the second and fourth system volumes, the first and fourth system volumes being connected to the compression chambers of the wheel rams associated with one of the pairs of diagonally spaced wheel assemblies, the second and third system volumes being connected to the compression chambers of the wheel rams associated with the other pair of diagonally spaced wheel assemblies, the damping and stiffness system thereby providing substantially zero warp stiffness; and wherein the vehicle is primarily supported by the vehicle resilient support means which is functionally separate from the damping and stiffness system; and wherein the vehicle suspension system having the damping and stiffness system further includes a pressure maintenance device connected in fluid communication to the first, second, third and fourth system volumes to maintain the static pressure of said system volumes at a substantially common pressure.

2. The vehicle suspension system having the damping and stiffness system as claimed in claim 1 wherein the pressure maintenance device is further connected in fluid communication to the first and second modal resilience volumes to maintain the static pressure of the modal resilience volumes at substantially the same common pressure.

3. A vehicle suspension system having a damping and stiffness system for a vehicle, the vehicle including a vehicle body and a first pair and a second pair of diagonally spaced wheel assemblies, the first pair of diagonally spaced wheel assemblies including at least one front left wheel assembly and at least one back right wheel assembly, the second pair of diagonally spaced wheel assemblies including at least one front right wheel assembly and at least one back left wheel assembly, the vehicle suspension system also including front and rear vehicle resilient support means between the vehicle body and the wheel assemblies for resiliently supporting the vehicle above the wheel assemblies, the damping and stiffness system including:

at least one wheel ram located between each wheel assembly and the vehicle body, each ram including at least a compression chamber;

a load distribution unit interconnected between the compression chambers of the front left, front right, back left and back right wheel rams, the load distribution unit including first and second piston rod assemblies, first, second, third and fourth system volumes and first and second modal resilience volumes, the first piston rod assembly defining first, second, third and fourth effective areas, the second piston rod assembly defining fifth, sixth, seventh and eighth effective areas, the first and second piston rod assemblies being located within the load distribution unit such that each piston rod assembly can rotate about and slide along a major axis of the piston rod assembly, the first effective area defines a movable wall of the first system volume such that as the first piston rod assembly slides along its major axis, the volume of the first system volume varies, the second effective area defines a moveable wall of the second system volume, the third effective area defines a movable wall of the first modal resilience volume, the fourth effective area defines a movable wall of the second modal resilience volume, the fifth effective area defines a movable wall of the third system volume such that as the second piston rod assembly slides along its major axis, the volume of the third system volume varies, the sixth effective area defines a moveable wall of the fourth system volume, the seventh effective area defines a movable wall of the first modal resilience volume, and the eighth effective area defines a movable wall of the second modal resilience volume, the first system volume increasing in volume proportionately to the decrease in volume of the second system volume with motion of the first piston rod assembly, the third system volume increasing in volume proportionately to the decrease in volume of the fourth system volume with motion of the second piston rod assembly, the volume of the first modal resilience volume decreasing proportionately to the increase in volume of the first and third system volumes with motion of the first and second piston rod assemblies, the volume of the second modal resilience volume decreasing proportionately to the increase in volume of the second and fourth system volumes, the first and fourth system volumes being connected to the compression chambers of the wheel rams associated with one of the pairs of diagonally spaced wheel assemblies, the second and third system volumes being connected to the compression chambers of the wheel rams associated with the other pair of diagonally spaced wheel assemblies, the damping and stiffness system thereby providing substantially zero warp stiffness; and wherein the vehicle is primarily supported by the vehicle resilient support means which is functionally separate from the damping and stiffness system; and wherein the first system volume is connected to the compression chamber of the at least one wheel ram associated with the at least one front left wheel assembly, the second system volume is connected to the compression chamber of the at least one wheel ram associated with the at least one front right wheel assembly, the third system volume is connected to the compression chamber of the at least one wheel ram associated with the at least one back left wheel assembly and the fourth system volume is connected to the compression chamber of the at least one wheel ram associated with the at least one back right wheel assembly, the first modal resilience volume thereby being a left roll resilience volume and the second modal resilience volume thereby being a right roll resilience volume; the left and right roll resilience volumes thereby providing the damping and stiffness system with additional roll resilience, independent of the pitch and heave stiffness of the damping and stiffness system.

4. A vehicle suspension system having a damping and stiffness system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

a load distribution unit, including a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a front left system chamber and being connected to the compression chamber of a front wheel ram on a left side of the vehicle, the other secondary chamber in the first pair of primary chambers which varies in volume in the same direction as the front system chamber with motion of the first piston rod assembly, being a first right roll chamber, one of the secondary chambers in the first pair of primary chambers which varies in volume in the opposite direction to the front left system chamber with motion of the first piston rod assembly being a front right system chamber and being connected to the compression chamber of the other front wheel ram on a right side of the vehicle, the other secondary chamber in the first pair of primary chambers which varies in volume in the same direction as the front right system chamber with motion of the first piston rod assembly, being a first left roll chamber, one of the secondary chambers in the second pair of primary chambers being a back left system chamber and being connected to the compression chamber of a back wheel ram on the left side of the vehicle, the other secondary chamber in the second pair of primary chambers which varies in volume in the same direction as the back left system chamber with motion of the second piston rod assembly, being a second right roll chamber, one of the secondary chambers in the second pair of primary chambers which varies in volume in the opposite direction as the second front system chamber with motion of the second piston rod assembly being a back right system chamber and being connected to the compression chamber of a back wheel ram on the right side of the vehicle, the other secondary chamber in the second pair of primary chambers which varies in volume in the same direction as the back right system chamber with motion of the second piston rod assembly, being a second left roll chamber, and the first and second left roll chambers being interconnected forming a left roll volume and the first and second right roll chambers being interconnected forming a right roll volume;

wherein the vehicle is primarily supported by the vehicle resilient support means which is functionally separate from the damping and stiffness system.

5. A vehicle suspension system having a damping and stiffness system according to claim 4 further including a pressure maintenance device connected in fluid communication to at least four of the secondary chambers in the load distribution unit by respective pressure maintenance passages to maintain the static pressure of said at least four secondary chambers at a substantially common pressure.

6. A vehicle suspension system having a damping and stiffness system as claimed in claim 4 wherein the wheel rams of at least the two front or the two rear wheel rams are single-acting rams.

7. A vehicle suspension system having a damping and stiffness system according to claim 4 wherein each wheel ram is a double-acting ram further including a rebound chamber, the rebound chamber of each double-acting wheel ram being connected to the compression chamber of the diagonally opposite wheel ram.

8. A vehicle suspension system having a damping and stiffness system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, includes a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a first front system chamber and being connected to the compression chamber of a front wheel ram on a first side of the vehicle, the other secondary chamber in the first pair of primary chambers which varies in volume in the same direction as the first front system chamber with motion of the first piston rod assembly, being a first back pitch chamber, one of the secondary chambers in the first pair of primary chambers which varies in volume in the opposite direction as the first front system chamber with motion of the first piston rod assembly being a first back system chamber and being connected to the compression chamber of a back wheel ram on a first side of the vehicle, the other secondary chamber in the first pair of primary chambers which varies in volume in the same direction as the first back system chamber with motion of the first piston rod assembly, being a first front pitch chamber, one of the secondary chambers in the second pair of primary chambers being a second front system chamber and being connected to the compression chamber of a front wheel ram on a second side of the vehicle, the other secondary chamber in the second pair of primary chambers which varies in volume in the same direction as the second front system chamber with motion of the second piston rod assembly, being a second back pitch chamber, one of the secondary chambers in the second pair of primary chambers which varies in volume in the opposite direction as the second front system chamber with motion of the second piston rod assembly being a second back system chamber and being connected to the compression chamber of a back wheel ram on a second side of the vehicle, the other secondary chamber in the second pair of primary chambers which varies in volume in the same direction as the second back system chamber with motion of the second piston rod assembly, being a second front pitch chamber, and the first and second front pitch chambers being interconnected forming a front pitch volume and the first and second back pitch chambers being interconnected forming a back pitch volume;

wherein the vehicle is primarily supported by the vehicle resilient support means which is functionally separate from the damping and stiffness system; and wherein the front pitch volume is connected to the back pitch volume through a pitch valve arrangement.

9. A vehicle suspension system having a damping and stiffness system according to claim 8 wherein the pitch valve arrangement includes at least one pitch damper valve to provide pitch damping.

10. A vehicle suspension system having a damping and stiffness system according to claim 9 wherein the at least one pitch damper valve is a variable damper valve.

11. A vehicle suspension system having a damping and stiffness system according to claim 9 wherein the pitch valve arrangement further includes a bypass passage and a bypass valve, the bypass passage being connected to either side of the at least one pitch damper valve, the bypass valve being located in the bypass passage and being switchable to enable or disable the pitch damping.

12. A vehicle suspension system having a damping and stiffness system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, includes a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a first front system chamber and being connected to the compression chamber of a front wheel ram on a first side of the vehicle, the other secondary chamber in the first pair of primary chambers which varies in volume in the same direction as the first front system chamber with motion of the first piston rod assembly, being a first back pitch chamber, one of the secondary chambers in the first pair of primary chambers which varies in volume in the opposite direction as the first front system chamber with motion of the first piston rod assembly being a first back system chamber and being connected to the compression chamber of a back wheel ram on a first side of the vehicle, the other secondary chamber in the first pair of primary chambers which varies in volume in the same direction as the first back system chamber with motion of the first piston rod assembly, being a first front pitch chamber, one of the secondary chambers in the second pair of primary chambers being a second front system chamber and being connected to the compression chamber of a front wheel ram on a second side of the vehicle, the other secondary chamber in the second pair of primary chambers which varies in volume in the same direction as the second front system chamber with motion of the second piston rod assembly, being a second back pitch chamber, one of the secondary chambers in the second pair of primary chambers which varies in volume in the opposite direction as the second front system chamber with motion of the second piston rod assembly being a second back system chamber and being connected to the compression chamber of a back wheel ram on a second side of the vehicle, the other secondary chamber in the second pair of primary chambers which varies in volume in the same direction as the second back system chamber with motion of the second piston rod assembly, being a second front pitch chamber, and the first and second front pitch chambers being interconnected forming a front pitch volume and the first and second back pitch chambers being interconnected forming a back pitch volume;

wherein the vehicle is primarily supported by the vehicle resilient support means which is functionally separate from the damping and stiffness system; and wherein the front pitch volume is connected to a front pitch accumulator through a front pitch damper valve and the back pitch volume may be connected to a back pitch accumulator through a back pitch damper valve, the front and back pitch accumulators provide additional pitch resilience in the stiffness and damping system;

wherein the front pitch volume is connected to the back pitch volume by a pitch stiffness valve.

13. A vehicle suspension system having a damping and stiffness system as claimed in claim 12 wherein the pitch stiffness valve is a damper valve.

14. A vehicle suspension system having a damping and stiffness system as claimed in claim 12 wherein the pitch stiffness valve is a lockout valve to isolate the front pitch volume from the back pitch volume.

15. A vehicle suspension system having a damping and stiffness system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, includes a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a first front system chamber and being connected to the compression chamber of a front wheel ram on a first side of the vehicle, the other secondary chamber in the first pair of primary chambers which varies in volume in the same direction as the first front system chamber with motion of the first piston rod assembly, being a first back pitch chamber, one of the secondary chambers in the first pair of primary chambers which varies in volume in the opposite direction as the first front system chamber with motion of the first piston rod assembly being a first back system chamber and being connected to the compression chamber of a back wheel ram on a first side of the vehicle, the other secondary chamber in the first pair of primary chambers which varies in volume in the same direction as the first back system chamber with motion of the first piston rod assembly, being a first front pitch chamber, one of the secondary chambers in the second pair of primary chambers being a second front system chamber and being connected to the compression chamber of a front wheel ram on a second side of the vehicle, the other secondary chamber in the second pair of primary chambers which varies in volume in the same direction as the second front system chamber with motion of the second piston rod assembly, being a second back pitch chamber, one of the secondary chambers in the second pair of primary chambers which varies in volume in the opposite direction as the second front system chamber with motion of the second piston rod assembly being a second back system chamber and being connected to the compression chamber of a back wheel ram on a second side of the vehicle, the other secondary chamber in the second pair of primary chambers which varies in volume in the same direction as the second back system chamber with motion of the second piston rod assembly, being a second front pitch chamber, and the first and second front pitch chambers being interconnected forming a front pitch volume and the first and second back pitch chambers being interconnected forming a back pitch volume;

wherein the vehicle is primarily supported by the vehicle resilient support means which is functionally separate from the damping and stiffness system; and wherein a roll valve is provided to interconnect at least one of the compression chambers of the at least two front wheel rams and the compression chambers of the at least two back wheel rams.

16. A vehicle suspension system having a damping and stiffness system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, includes a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a first front system chamber and being connected to the compression chamber of a front wheel ram on a first side of the vehicle, the other secondary chamber in the first pair of primary chambers which varies in volume in the same direction as the first front system chamber with motion of the first piston rod assembly, being a first back pitch chamber, one of the secondary chambers in the first pair of primary chambers which varies in volume in the opposite direction as the first front system chamber with motion of the first piston rod assembly being a first back system chamber and being connected to the compression chamber of a back wheel ram on a first side of the vehicle, the other secondary chamber in the first pair of primary chambers which varies in volume in the same direction as the first back system chamber with motion of the first piston rod assembly, being a first front pitch chamber, one of the secondary chambers in the second pair of primary chambers being a second front system chamber and being connected to the compression chamber of a front wheel ram on a second side of the vehicle, the other secondary chamber in the second pair of primary chambers which varies in volume in the same direction as the second front system chamber with motion of the second piston rod assembly, being a second back pitch chamber, one of the secondary chambers in the second pair of primary chambers which varies in volume in the opposite direction as the second front system chamber with motion of the second piston rod assembly being a second back system chamber and being connected to the compression chamber of a back wheel ram on a second side of the vehicle, the other secondary chamber in the second pair of primary chambers which varies in volume in the same direction as the second back system chamber with motion of the second piston rod assembly, being a second front pitch chamber, and the first and second front pitch chambers being interconnected forming a front pitch volume and the first and second back pitch chambers being interconnected forming a back pitch volume;

wherein the vehicle is primarily supported by the vehicle resilient support means which is functionally separate from the damping and stiffness system; and wherein the vehicle suspension system having the damping and stiffness system further includes a pressure maintenance device connected in fluid communication to at least four of the secondary chambers in the load distribution unit by respective pressure maintenance passages to maintain the static pressure of said at least four secondary chambers at a substantially common pressure.

17. A vehicle suspension system having a damping and stiffness system according to claim 16 further including a valve in each pressure maintenance passage.

18. A vehicle suspension system having a damping and stiffness system according to claim 16 further including a restriction in each pressure maintenance passage.

19. A vehicle suspension system having a damping and stiffness system as claimed in claim 16 wherein the pressure maintenance device includes a fluid pressure source.

20. A vehicle suspension system having a damping and stiffness system as claimed in claim 16 wherein the pressure maintenance device includes an accumulator.

21. A vehicle suspension system having a damping and stiffness system according to claim 19 wherein the pressure maintenance unit is controlled to regulate the static pressure in the at least four secondary chambers to a preset pressure.

22. A vehicle suspension system having a damping and stiffness system according to claim 21 wherein the preset pressure can be varied.

23. A vehicle suspension system having a damping and stiffness system for a vehicle, the vehicle including a vehicle body and at least two forward and two rearward wheel assemblies, the vehicle suspension system also including front and rear vehicle resilient support means between the vehicle body and the wheel assemblies for resiliently supporting the vehicle above the wheel assemblies, the damping and stiffness system including:

at least two front and two rear wheel rams located between the wheel assemblies and the vehicle body, each ram including at least a compression chamber;

a load distribution unit, includes a first pair of axially aligned primary chambers and a second pair of axially aligned primary chambers, each primary chamber including a piston separating each primary chamber into two secondary chambers, a first rod connecting the pistons of the two first primary chambers, forming a first piston rod assembly and a second rod connecting the pistons of the two second primary chambers forming a second piston rod assembly, one of the secondary chambers in the first pair of primary chambers being a first front system chamber and being connected to the compression chamber of a front wheel ram on a first side of the vehicle, the other secondary chamber in the first pair of primary chambers which varies in volume in the same direction as the first front system chamber with motion of the first piston rod assembly, being a first back pitch chamber, one of the secondary chambers in the first pair of primary chambers which varies in volume in the opposite direction as the first front system chamber with motion of the first piston rod assembly being a first back system chamber and being connected to the compression chamber of a back wheel ram on a first side of the vehicle, the other secondary chamber in the first pair of primary chambers which varies in volume in the same direction as the first back system chamber with motion of the first piston rod assembly, being a first front pitch chamber, one of the secondary chambers in the second pair of primary chambers being a second front system chamber and being connected to the compression chamber of a front wheel ram on a second side of the vehicle, the other secondary chamber in the second pair of primary chambers which varies in volume in the same direction as the second front system chamber with motion of the second piston rod assembly, being a second back pitch chamber, one of the secondary chambers in the second pair of primary chambers which varies in volume in the opposite direction as the second front system chamber with motion of the second piston rod assembly being a second back system chamber and being connected to the compression chamber of a back wheel ram on a second side of the vehicle, the other secondary chamber in the second pair of primary chambers which varies in volume in the same direction as the second back system chamber with motion of the second piston rod assembly, being a second front pitch chamber, and the first and second front pitch chambers being interconnected forming a front pitch volume and the first and second back pitch chambers being interconnected forming a back pitch volume;

wherein the vehicle is primarily supported by the vehicle resilient support means which is functionally separate from the damping and stiffness system; and the vehicle suspension system having the damping and stiffness system further including a pressure maintenance device, the pressure maintenance device including a first and a second output pressure, the first output pressure being connected to the first front, second front, first back and second back system chambers of the load distribution unit by respective system pressure maintenance passages, the second output pressure being connected to the front pitch volume and the back pitch volume by respective pitch pressure maintenance passages.

24. A vehicle suspension system having a damping and stiffness system according to claim 23 wherein the pressure maintenance device includes a fluid pressure source, the pressure in the system chambers being controlled to a first preset pressure, the pressure in the pitch volumes being controlled to a second preset pressure, the first preset pressure being variable to vary the roll stiffness of the damping and stiffness system separately to the pitch stiffness, the second preset pressure being variable to vary the pitch stiffness of the damping and stiffness system.

25. A vehicle suspension system having a damping and stiffness system according to claim 1 further including resilient centering devices to provide a centering force on the piston rod assemblies in the load distribution unit to bias the piston rod assemblies towards a mid-stroke position.

* * * * *